United States Patent Office 3,067,328
Patented Dec. 4, 1962

3,067,328
INSPECTION OF CRUSTACEANS
Leslie N. Harrison, 1405 Alegriano, Coral Gables, Fla.
Filed Jan. 6, 1955, Ser. No. 480,279
No Drawing.
5 Claims. (Cl. 250—71)

My invention relates to inspection and examination of crustaceans or shell fish and particularly shrimp and prawns which will be used for purposes of illustration. It is also applicable to spiny or rock lobster or crawfish.

An object of my invention is to provide an accurate and simple method of determining the freshness of shrimp and how long it is safe to keep them and when they must be discarded.

Another object of my invention is to accomplish this result in a simple and rapid manner on the basis of individual animals and without the necessity of sampling or destroying any of the animals.

Another object of my invention is to permit the identification and separation of individual animals that are inedible or will not safely stand storage without the necessity of destroying large numbers of shrimp and the resultant waste, many of which may actually be of satisfactory quality.

As is well known, the time during which crustaceans, particularly shrimp, remain edible after death is limited. It is obviously of the greatest importance to the health of the consumer, as well as to the continued good will of the industry, to be able to identify the particular animals in any collection of shrimp or other shellfish which might be either totally spoiled or so far deteriorated that they could not be safely stored and would constitute a public health hazard.

Up to the present time the only methods which have been available for the detection and identification of incipient spoilage in shrimp have been organoleptic, that is actual tasting by an educated taste panel of expert tasters, or by chemical methods. In the former technique it is necessary that a processor maintain a staff of experienced tasters in his plant. They frequently cannot be profitably employed at other less specialized tasks. The shrimp which are to be tasted must be selected from a much larger sample, often hundreds of pounds, which introduces errors and uncertainties inherent in all sampling techniques. The shrimp must be cooked, tasted and evaluated, all of which processes take time and yield, at best, an expression of statistical probability concerning the acceptability of the total batch.

Chemical methods which have been proposed for the identification of deterioration in shrimp and shellfish involve the quantitative determination of the concentration of free fatty acids, total volatile acids, indole, skatole, free amino acids, non-protein nitrogen, amino nitrogen and tests for certain other products of the degradation of proteins. These methods are all characterized by the necessity of selecting an analytical sample from a much larger batch of material. It is extremely difficult to insure that the sample which is removed for analysis is truly representative of the entire lot.

It is obviously never possible to analyze every single animal in a given commercial batch of shrimp because the testing method is totally destructive, i.e., after the tests have been completed there remains nothing to be sold to the ultimate consumer. In addition to this manifest inadequacy there remains a still more important source of uncertainty which is that there is no widespread agreement among analysts about the signilcance of any of the results which are obtained. The tests have an extremely small predictive value. There is normally very little correlation between the results as expressed by the taste panel and the values arrived at by chemical analysis. For example, by the time that the indole concentration has risen sufficiently to become measurable, according to existing analytical methods, the shrimp will already have deteriorated so far that the test becomes meaningless. They are obviously putrid.

What is necessary, and what is proposed in this application, is a method of non-destructive analysis of every shrimp in a given batch which shall be instantaneous in its action, which shall require no highly trained technical personnel, and which will provide information about the onset of deterioration in quality before this has become sensible to the most highly trained taste panel.

The testing method will first be described in general terms, as to procedures and results, and this description will then be further amplified by means of an example.

When intact living, or just dead shrimp are exposed to light in the violet and ultra-violet region of the spectrum, preferably 250 to 375 millimicrons (one millimicron equals 10 Angstrom units; one Angstrom unit equals $10^{-8}$ cm.) there is elicited an intense white fluorescence in the shell of the animal. It has been shown that this fluorescence is due to the specific activity of the substance chitin which constitutes the greater bulk of the exoskeleton or shell. If the shell be removed from such a fresh animal the underlying flesh, that is, the edible portion of the shrimp, will be seen to produce a purple-violet fluorescence when irradiated with light in the same energy range as was used before, that is preferably 250 to 375 millimicrons wave length. This purple violet fluorescence is the characteristic fluorescence response of fresh or living shrimp flesh.

If now a similar series of observations be made on shrimp which have been stored, under standard commercial conditions for varying periods of time, it will be observed that the white fluorescence of the shell is unmodified during a prolonged period of storage in ice. However, the flesh or shell-free residue, that is, the edible portion of the shrimp, will be observed to undergo a progressive modification of the fluorescence pattern. These changes involve a gradual dilution of the purple-violet fluorescence by the appearance of a dirty-white fluorescence commencing at the headed end of the shrimp. This increases in intensity and in area with the passage of time. The longer that the shrimp is held in ice the more intense becomes the white fluorescence of the shell-free flesh of the shrimp and the more of its area tends to be involved in this change.

After removing heads of shrimp before removing shells, the animals may be examined under ultra-violet light in position whereby the flesh of the headed end is visible. Since as pointed out above the deterioration of the shrimp flesh commences at the headed end, this examination will show initial deterioration.

This variation of my invention extends its usefulness to the inspection of headed but unpeeled shrimp, which is the state in which the processor normally receives the animals.

If simultaneous taste panel tests be made, either on the same shrimp or on others held for the same length of time under the same conditions, a positive and clear correlation becomes apparent. The fluorescence changes always begin from one to two days earlier, in any given lot of shimp, than the organoleptic deterioration in quality. Obviosuly, then, these changes in the nature of the ultraviolet-induced fluorescence in shrimp have great predictive value so far as the quality of the shrimp is concerned.

Further specific operation of the tests will be elaborated in the following example:

Following the observation that the fluorescence of shrimp flesh undergoes changes with time in storage, experimental verification of this fact, and correlation with taste-panel results was accomplished in the following manner:

Through the cooperation of a commercial shrimp fisherman, the fishing vessel was accompanied on one of its regular trawling runs. The last scheduled trawl of the trip provided the animals to be used for the test. From the total yield of this trawl of about 300 pounds, a sample of approximately 100 pounds was selected at random. This sample was placed immediately in previously prepared and iced bins aboard the vessel. Within three hours the vessel had docked and the shrimp were rapidly transferred into a waiting cooled vehicle for immediate delivery to the laboratory. There they were held in crushed ice, under conditions which duplicated those currently used in the shrimp industry.

At intervals of twenty-four hours samples were removed and peeled for evaluation both chemically and by the taste panel. The samples destined for chemical analysis were irradiated with an ultraviolet light source with a peak energy transmission at 366.0 millimicrons.

Chemical analyses accomplished were moisture; total nitrogen; total fat; ash; pH; and indole. Since the results of these analyses are irrelevant to the present example they will not be further considered in this application.

Samples were taken daily. On the seventh day the nature of the fluorescence of the peeled shrimp was observed to have changed. Instead of the uniform purple-violet which had characterized the animals in the ultra-violet light beam heretofore, they were now observed to be emitting a dirty-white fluorescence at the headed end. This was at first barely detectable and occupied no more than a millimeter of the total length of the headed shrimp. On subsequent days this white fluorescence was observed to be reinforced and to have progressed over more and more of the total area of the shrimp. On the ninth day, two days after this change in fluorescence had first been observed, the taste panel first reported that there was a slight but still sensible deterioration in quality of the shrimp. This was not serious and would probably have been undetectable by the layman at this point. On the following days, of course, the quality deteriorated still further, when judged organoleptically, and the white fluorescence increased in both extent and in intensity.

Several results of this initial experiment should be emphasized: First, and most importantly, the change in fluorescence preceded by forty-eight hours the realization by the taste panel that the quality of the product was deteriorating. Secondly, the change did not begin simultaneously in all the shrimp of the batch but, like spoilage itself, was on an individual basis so that no sampling method could be accurate. Finally the change in fluorescence under the ultra-violet light was sufficiently clear and obvious, that it could be detected by nearly anyone after the most brief instruction period.

The ultra-violet light examination is normally carried out in a dark room with an overhead source of ultra violet light, an endless belt conveyor for the shrimp and proper protection for the workers. An unskilled worker can be quickly trained to examine the shrimp and remove the ones which show the dirty white fluorescence characteristic of the deteriorating shrimp which are individually removed. Each individual shrimp is positioned so as to be visible to the operator since the examination includes every animal.

In another variation of my invention filters such as polarizing or similar filters can be arranged so as to pass only the dirty white fluorescence of deteriorating shrimp flesh and not the purple fluorescence of fresh shrimp flesh. In this way only the bad shrimp will be visible and can be even more readily detected for removal than without the filters.

Other variations of my invention will be apparent to those skilled in the art and my invention is to be limited only by the following claims.

I claim:

1. The method of separating deteriorated crustaceans from undeteriorated crustaceans which comprises removing the shells of fresh crustaceans, subjecting the crustacean flesh to ultra-violet light and removing the crustaceans which show deterioration of said flesh under said ultra-violet light.

2. The method of separating deteriorated crustaceans from undeteriorated crustaceans which comprises removing the shells of fresh crustaceans, subjecting the crustacean flesh to ultra-violet light while said crustaceans are moving along an endless belt and are positioned so that each individual animal is visible to an operator, and removing the individual crustaceans which show deterioration of said flesh.

3. The method of examining shrimps for edibility which comprises removing the shells of fresh shrimps, subjecting the shrimp flesh to ultra-violet light in the wave length from about 250 millimicrons to about 375 millimicrons, examining said shrimps under said ultra-violet light, and removing the individual shrimps which show deterioration of said flesh by the appearance of a dirty-white fluorescence.

4. The method of examining shrimps for edibility which comprises removing the shells of fresh shrimps, arranging the shrimps on a moving belt so that each individual shrimp is visible, subjecting said shrimps to ultra-violet light in a wave length range of from about 250 to about 375 millimicrons, examining said shrimps and removing the individual shrimps which show an excessive amount of dirty white fluorescence under said ultra-violet light.

5. The method of examining shrimps for edibility which comprises removing the shells of fresh shrimps, arranging the shrimps on a moving belt in a dark room so that each individual shrimp is visible, subjecting said shrimps to ultra-violet light in a wave length range of from about 250 to about 375 millimicrons, filtering from the reflected light all but the rays showing dirty-white fluorescence, examining said shrimps and removing the individual shrimps which show an excessive amount of dirty white fluorescence under said ultra-violet light.

References Cited in the file of this patent

UNITED STATES PATENTS

| | | |
|---|---|---|
| 1,982,029 | Sperti | Nov. 27, 1934 |
| 2,321,900 | Dooley | June 15, 1943 |
| 2,470,341 | Darrah | May 17, 1949 |
| 2,551,542 | Marsh et al. | May 1, 1951 |
| 2,776,213 | Borg | Jan. 1, 1957 |

OTHER REFERENCES

Luminescence of Liquids and Solids, by Pringsheim et al., published in 1943 by Interscience Publishers, Inc., New York, N.Y., pages 118–123.